MULTIAPERTURED MAGNETIC CORE STORAGE MEMORY

INVENTORS: E.E. NEWHALL
J.R. PERUCCA
BY
Lucian C. Canepa
ATTORNEY

United States Patent Office 3,328,780
Patented June 27, 1967

3,328,780
MULTIAPERTURED MAGNETIC CORE STORAGE MEMORY

Edmunde E. Newhall, Brookside, and James R. Perucca, Sayreville, N.J., assignors to Bell Telephone Laboratories, Incorporated, New York, N.Y., a corporation of New York Filed Mar. 18, 1963, Ser. No. 265,815
19 Claims. (Cl. 340—174)

This invention relates to magnetic core circuits and, more specifically, to a multiapertured magnetic core storage memory which may advantageously be nondestructively interrogated.

Magnetic circuits which supply a selected one of a plurality of groups of information digits to a common set of output terminals are well known. Perhaps the most common and extensively employed of such circuits is the word-organized, random access information storage memory. Typically, digital information is supplied to a store during a write-in process and is stored at discrete address locations in magnetic binary memory elements. Each of the binary characters may be represented, for example, by one of the two distinct maximum remanent hysteresis polarities, and one binary bit may be stored for each element employed. When the stored information is desired, the corresponding address is interrogated by driving each of the memory elements included in the address to one of the saturation conditions. In response thereto, output signals, representative of the information word stored thereat, are supplied to a common set of output terminals.

However, as each of the elements of such a storage memory is driven to the same magnetic condition during the interrogation process, information is no longer stored therein, and a new write-in cycle is required after each interrogation. Moreover, as the interrogation driving signals are typically generated by switching toroidal access cores between remanent saturation states, with the storage elements undergoing similar changes in their magnetic conditions, the maximum repetition rate of the storage memory is limited by the heat dissipation capability of the access cores and memory elements.

It is therefore an object of the present invention to provide an improved information storage arrangement.

More specifically, it is an object of the present invention to provide an information store which may be nondestructively interrogated.

It is another object of the present invention to provide a magnetic information storage arrangement which is highly reliable and which may advantageously be inexpensively and easily constructed.

Still another object of the present invention is the provision of a magnetic information store which may be nondestructively interrogated at a high repetition rate.

These and other objects of the present invention are realized in a specific illustrative, nondestructively interrogated memory arrangement employing a plurality of ferromagnetic multiapertured cores. Each core includes a high speed interrogation flux source connected in parallel with a shunt write-in leg. A cross leg is provided to complete closed magnetic paths which include either the shunt leg or the flux source, and a plurality of apertures are centrally located along the long axis of the cross leg. Coupled to each aperture is an input winding and an output winding which links the ferromagnetic material on either side of the aperture in an opposite polarity.

An enabling winding is provided to drive the core cross leg to a neutral magnetic condition thereby allowing information to be supplied thereto by the input windings. During the nondestructive interrogation process, the cross leg is alternately driven between a neutral state and a magnetic condition intermediate neutral and remanent saturation, thereby supplying information signals to the output windings.

It is thus a feature of the present invention that a magnetic information storage arrangement include a plurality of square loop multiapertured cores each of which includes a cross leg with a plurality of apertures centrally located thereon, and that a high speed flux source be connected in parallel with the cross leg for driving the cross leg between two magnetic conditions neither of which is a saturation condition.

It is another feature of the present invention that a high speed magnetic information storage arrangement include a multiapertured core in which no member included therein is driven between maximum remanent conditions during the interrogation cycle.

A complete understanding of the present invention and of the above and other features, variations and advantages thereof may be gained from a consideration of the following detailed description of an illustrative embodiment thereof presented hereinbelow in conjunction with the accompanying drawing, in which.

Figure 1:
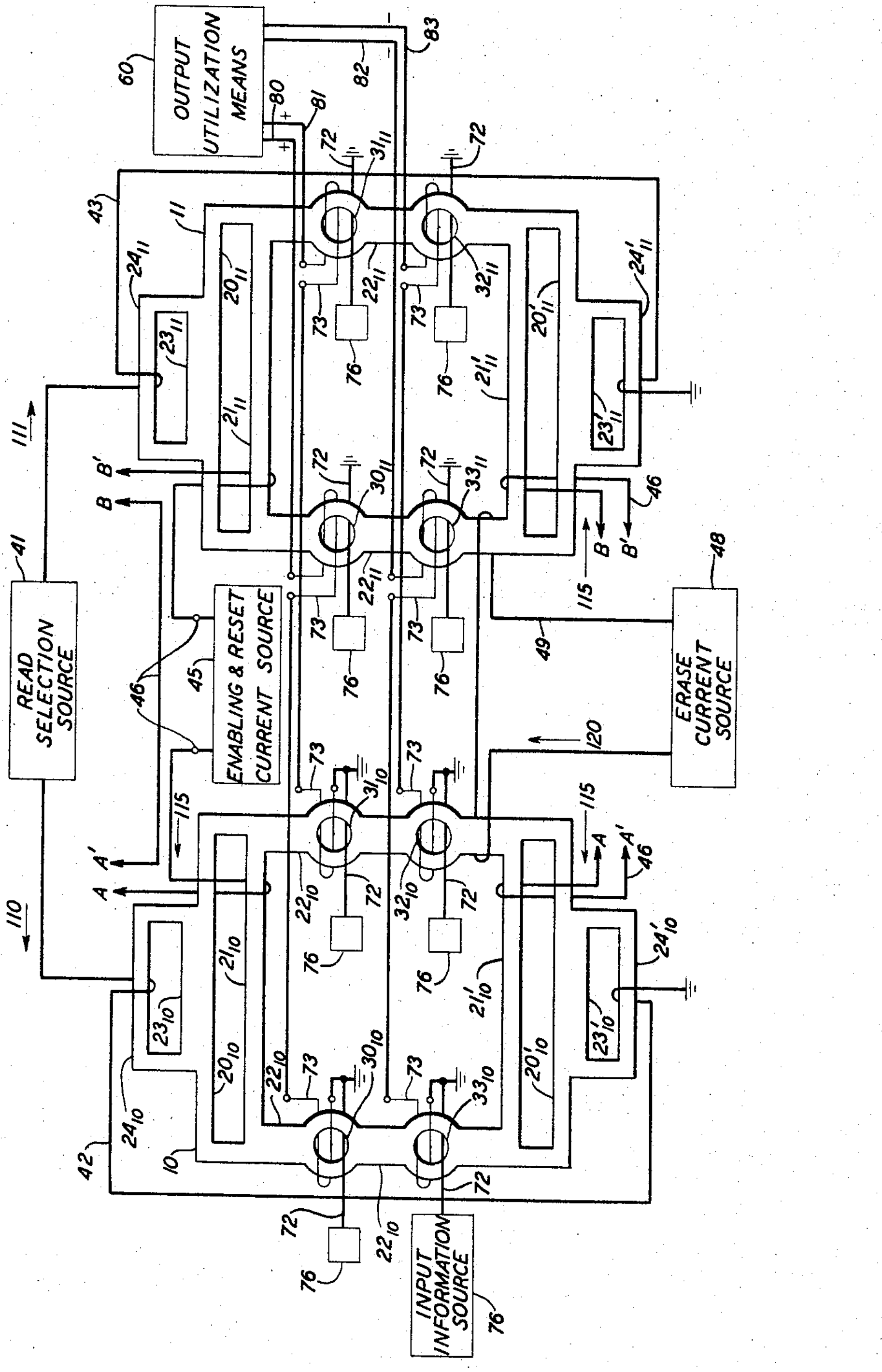
FIG. 1 is a diagram of a specific illustrative multiapertured core information store which embodies the principles of the present invention.

Referring now to FIG. 1, there is shown a specific, illustrative magnetic core information store which includes two multiapertured square loop, ferromagnetic cores 10 and 11. Each core includes two driving legs 20 and 20′, each connected in parallel with a shunt leg 21 and 21′, respectively. Two cross legs 22 are provided, each connecting a junction of the driving leg 20 and the shunt leg 21 with the corresponding junction of the legs 20′ and 21′. Each of the cross legs 22 has a uniform cross-sectional area which is twice the magnitude of that possessed by each of the driving legs 20 and 20′ and the shunt legs 21 and 21′, all of the aforementioned magnetic legs having a like value of remanent saturation. Hence, each of the cross legs 22 has twice the flux carrying capacity of either of the driving legs 20 and 20′ or the shunt legs 21 and 21′. Bias legs 23 and 23′, having a cross-sectional area intermediate the values characterizing the legs 20 and 22, are respectively connected in series with the driving legs 20 and 20′. Interrogation legs 24 and 24′, each characterized by a like value of flux cpacity as each of the driving legs 20 and 20′, are connected in parallel with the bias legs 23 and 23′, respectively. It is noted at this point that the legs 20, 23 and 24, and also the legs 20′, 23′ and 24′, each comprise one high speed interrogation flux source.

A plurality of apertures 30 through 33 are centrally located on the long axes of the cross legs 22 included in each of the cores 10 and 11. Coupled to each of the apertures 30 through 33 is an input winding 72 and an :put winding 73 which links the ferromagnetic ma- ial on each side of the aperture in an opposite polarity. e output windings coupled to corresponding apertures through 33 included in each of the cores 10 and 11 : respectively interconnected to form output circuits through 83 which are each grounded at one end and nnected at their other ends to an output utilization :ans 60.

A plurality of input information sources 76 are pro- led in the illustrative embodiment shown in FIG. 1, :h of the sources 76 being connected to a different one the input windings 72. The sources 76 supply input :elligence manifested by current pulses flowing in one the two possible directions. The sources 76 are ener- zed during a write-in portion of the over-all informa- n storage and interrogation cycle, and may comprise y of the plurality of well known intelligence signal urces including, for example, a plurality of control cir- it output signals or a counting or shaft register arrange- ent.

It is noted at this point that each one of a plurality of rcuit elements identified above is additionally desig- ited by one of the subscripts 10 or 11 indicating the irticular core 10 or 11 with which it is associated. ence, for example, the leg $21'_{11}$ corresponds to the shunt g 21' which is included in the multiapertured core 11.

An erasing winding 49 is coupled to one of the cross gs 22 included in each of the cores 10 and 11. The inding 49 is connected to an erase current source 48 hich supplies thereto a current in the direction of an rrow 120 (shown in FIG. 1 alongside the winding 49) ) essentially saturate each of the cores 10 and 11 in a lockwise manner, as described hereinafter.

Interrogation of the information word stored in an idividual core is accomplished by energizing a read se- :ction source 41 which is coupled to two interrogation /indings 42 and 43. Windings 42 and 43 are coupled to he interrogation legs 24 and 24' included in the cores 10 nd 11, respectively, such that currents supplied by the ource 41 in the direction of the vectors 110 and 111 pro- luce right to left saturation fluxes in the legs 24 and left o right saturation fluxes in the magnetic members 24'.

An enabling and reset current source 45 is provided, along with an enabling and reset winding 46 connected hereto, to perform the dual functions of enabling informa- ion to be stored in the cores, and resetting the cores after :ach nondestructive interrogation thereof. The winding 16 is coupled to the driving legs 20 and 20' and shunt egs 21 and 21' of the cores to couple magnetizing forces hereto in clockwise and counterclockwise directions, espectively, when energized with a current in the direc- ion of an arrow 115 shown in FIG. 1.

It is noted that the winding 46 is shown interrupted in FIG. 1, and that the portions of the winding coupled to :he driving and shunt legs 20' and 21' are shown disasso- ciated with the remainder of the winding 46. The drawing was so prepared for the purpose of clarity, and it is to be understood that the various portions of the winding 46 are in fact interconnected by joining the winding terminals marked with the same designations.

Before describing a typical sequence of circuit operation, the convention employed in FIGS. 3 through 5 to illustrate the magnetic condition of the ferromagnetic core legs will be described. Each vector therein represents a measure of magnetic flux, with a longer vector representing proportionally more flux than a shorter vector. The total additive length of the vectors contained in any particular magnetic member indicates the flux carrying capacity of the member and hence remains constant. The legs 20 and 20', 21 and 21', and 24 and 24' will in every case have flux vectors whose total length is two flux units while each of the cross legs 22, and bias legs 23 and 23', are characterized by vectors whose total lengths are respectively four and three units. Accordingly, a total vector length of two flux units is contained in the ferromagnetic material on each side of each of the apertures 30 through 33. When all the vectors in any magnetic member have a like orientation the fluxes are additive and the material is in a remanent saturation condition. When two vectors are of opposite polarities, the longer of the vectors depicts the direction of flux flowing through the corresponding member, and the flux has a magnitude proportional to the vector difference. When the flux vectors have a net zero difference, the associated material is magnetically neutral thereby having no magnetic lines of flux flowing therethrough.

Figure 3:
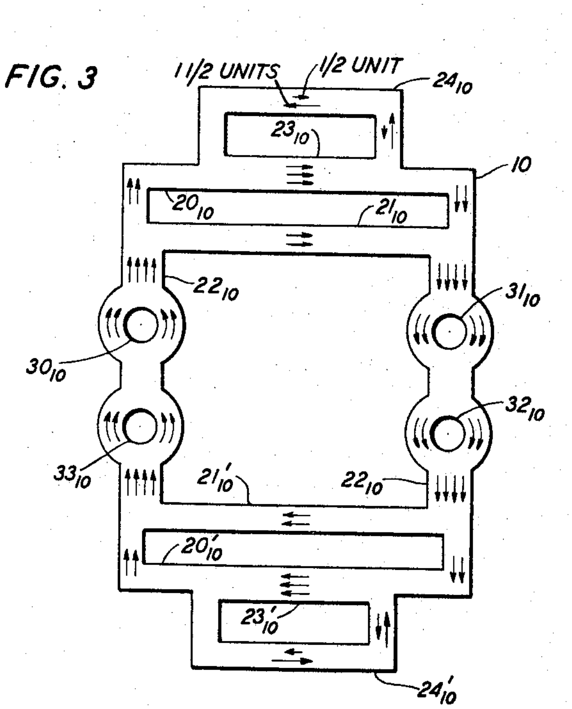
FIG. 3 is a diagram of a first magnetic condition for one of the multiapertured cores illustrated in FIG. 1.

Illustrating a typical cycle of operation for the FIG. 1 arrangement, assume that the cores 10 and 11 are in their clear, or erased states with a saturation clockwise flux flowing through each of the members included therein except for the members 24 and 24' which each have one net unit of flux, illustrated in FIG. 3 by a vector of one and one-half units flowing in one direction and a second vector one-half unit in magnitude flowing in the opposite direction, flowing in the counterclockwise direction. It is noted that selected flux vectors in FIGS. 3 and 5 disclose their relative unit lengths to further clarify these illustrations. This initial, erased magnetic condition is shown in FIG. 3 for the core 10. Note in FIG. 3 that the number of lines of flux flowing through the cross sections of any one of the members 20, 20', 21, 21', 22, 23, 23', 24 and 24' is identical, and that flux is conserved in each junction between any of the members. Hence, the fundamental physical principle that lines of flux be continuous is satisfied. If the bias members 23 and 23' are assumed initially saturated in the clockwise direction, the cores will be driven to the erased state by a single energization of the source 48 supplied to the winding 49 in the direction of the vector 120. In any case, the proper cleared initial condition results from an energization signal from the source 41 followed by a pulse supplied by the source 48.

The initial circuit operation is to read the input information supplied by the sources 76 into the corresponding core storage addresses. Assume that the sources 76 associated with the apertures $30_{10}$ and $31_{10}$ are supplying input current pulses flowing away from the sources in FIG. 1, while the sources 76 associated with the apertures $32_{10}$ and $33_{10}$ are supplying currents in the opposite direction.

To read the information into the core 10, the enabling current source 45 supplies a current to the winding 46 coincident with the pulses being supplied by the input sources 76. The magnetizing force supplied by the energized enabling winding 46 reverses the remanent hysteresis magnetization orientation in the shunt leg $21_{10}$ from its previous left to right direction illustrated in FIG. 3 to a right to left orientation illustrated in FIG. 4. Similarly, the shunt leg $21'_{10}$ switches its flux orientation and resides in a left to right condition as shown in FIG. 4. Note that two units of flux now flow in closed magnetic paths including the driving leg $20_{10}$ and shunt leg $21_{10}$, and the legs $20'_{10}$ and $21'_{10}$.

It is apparent that the energized enabling winding 46 must also supply a switching magnetizing force to reverse two flux units in the cross legs $22_{10}$, as no net flux can exist in either of these members under the above-identified magnetic states of the driving legs $20_{10}$ and $20'_{10}$ and shunt legs $21_{10}$ and $21'_{10}$. If any flux were contained in either of the legs $22_{10}$ it would have to be returned through either a driving leg or a shunt leg, as lines of flux must be continuous as mentioned above. However, each of the driving legs $20_{10}$ and $20'_{10}$ and shunt legs $21_{10}$ and $21'_{10}$ is in a saturated condition and, moreover, the driving leg $20_{10}$ and shunt leg $21_{10}$, and the driving leg $20'_{10}$ and shunt leg $21'_{10}$, already have two continuous units of flux flowing therethrough in two closed, completed magnetic paths. Hence, each of the cross legs $22_{10}$ is driven by the enabling energization from a saturation condition to a neutral condition as illustrated in FIG. 4.

The input windings 72 passing through the apertures $30_{10}$ and $31_{10}$ have currents flowing therethrough, supplied by the corresponding current sources 76, which generate a magnetizing force around each of these apertures. This magnetizing force aids the enabling winding magnetomotive force in the core material to the right of the aperture $30_{10}$ and to the left of the aperture $31_{10}$ while opposing the enabling magnetomotive force on the opposite side of each of these apertures. It is a well known physical principle of magnetics that the speed of domain wall motion, and thereby also the speed of square loop magnetic switching, is directly proportional to the applied magnetizing force. Therefore, since a larger force is supplied to the material to the right and left, respectively, of the apertures $30_{10}$ and $31_{10}$ than to the opposite sides of these apertures, the material with the greater field applied thereto switches at a more rapid rate of speed. Since the total flux switched in the material on both sides of each aperture is constrained to be two flux units, the greater portion of these two flux units is switched in the faster switching right-hand material around the aperture $30_{10}$, and in the left-hand material around the aperture $31_{10}$, resulting in the magnetic condition illustrated in FIG. 4.

Opposite flux conditions exist around the apertures $32_{10}$ and $33_{10}$, as compared to the apertures $31_{10}$ and $30_{10}$, respectively, since the assumed input information supplied thereto was of an opposite value. In a similar manner the information digits supplied by the input current sources 76 associated with the core 11 are stored as a net perturbation in either a clockwise or counter-clockwise direction around each of the apertures $30_{11}$ through $33_{11}$. At this point the write-in process is completed.

Figure 4:
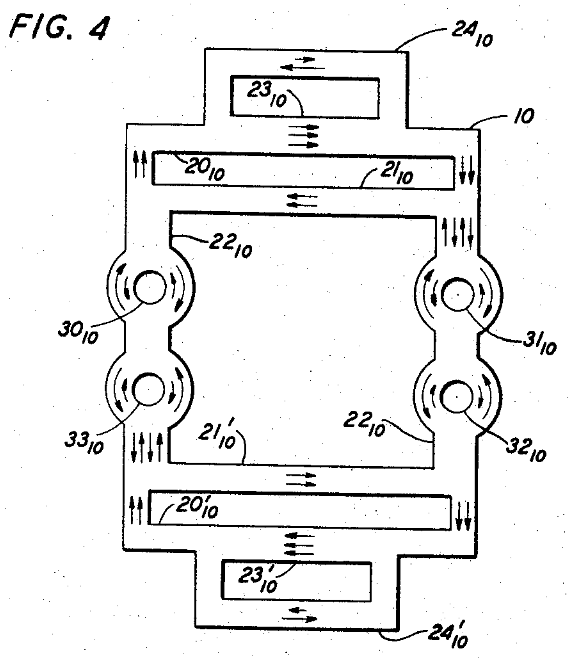
FIG. 4 is a diagram of a second magnetic condition for a particular multiapertured core illustrated in FIG. 1.

Assume now that it is desired to nondestructively interrogate the four-bit information word stored in the core 10 shown in FIG. 4. To accomplish this, the selection source 41 supplies a current in the direction of the vector 110 to the interrogation winding 42 coupled to the core 10, thereby driving the interrogation legs $24_{10}$ and $24'_{10}$ included therein to a counter-clockwise saturation condition, as represented in FIG. 5. In so doing, the energized winding 42 switches one unit of flux in a counter-clockwise direction in the legs $24_{10}$ and $24'_{10}$ which is also switched in the driving legs $20_{10}$ and $20'_{10}$, and in the cross legs $22_{10}$. The switching of one flux unit is illustrated in FIG. 5 for the legs $20_{10}$, $20'_{10}$, $24_{10}$, $24'_{10}$ and $22_{10}$ by a reversal of a one-half unit flux vector from a clockwise, to a counter-clockwise direction throughout the core 12. Note in the cross legs $22_{10}$, for example, that there are two and one-half flux units flowing in a counter-clockwise direction compared to one and one-half units in the opposite, clockwise direction resulting in one net counter-clockwise flux unit. Hence, when this flux condition is compared to the previously unmagnetized state of the cross legs $22_{10}$ shown in FIG. 4, it is clear that a net flux change of one unit has transpired in the legs $22_{10}$.

This unit of flux cannot, of course, be switched in the corresponding bias legs $23_{10}$ and $23'_{10}$ which are already in a saturated condition in the requisite direction. The one unit of flux switched in the cross legs $22_{10}$ must divide in the ferromagnetic material surrounding each of the apertures $30_{10}$ through $33_{10}$. It has been experimentally determined that a greater portion of the one unit will be switched in the material surrounding each aperture which is in a storage direction opposite to the counter-clockwise switching direction.

Figure 2A:
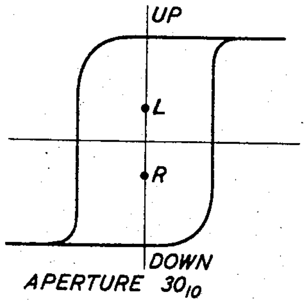
FIG. 2A is a hysteresis diagram indicating a first magnetic condition for the ferromagnetic material surrounding an aperture included in one of the multiapertured cores illustrated in FIG. 1.
Figure 2B:
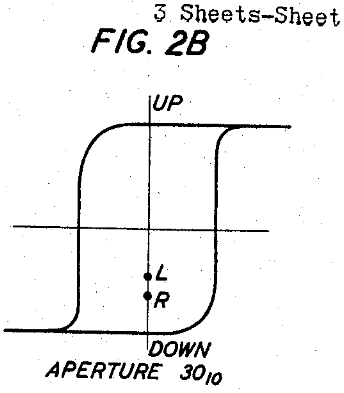
FIG. 2B is a hysteresis diagram illustrating a second magnetic condition for the material surrounding an aperture included in one of the multiapertured cores illustrated in FIG. 1.
Figure 2C:
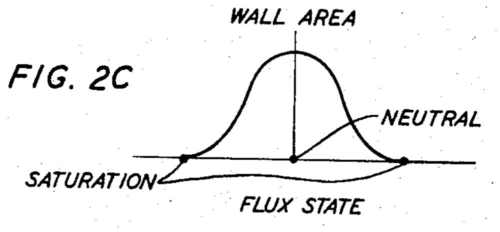
FIG. 2C is a graph depicting the relationship between magnetic wall area and the degree of magnetic saturation.

Examining FIG. 2A, a hysteresis characteristic is shown for the ferromagnetic material surrounding the aperture $30_{10}$ during the magnetic state illustrated in FIG. 4. Note that the regions to the left and right of the aperture $30_{10}$, designated L and R respectively, are depicted as being respectively closer to the vertical "up" and "down" magnetic remanent orientations shown for the core 10 in FIGS. 1 and 3 through 5. When the interrogation winding 42 switches one unit of flux in a counter-clockwise direction throughout the cross leg $22_{10}$, the flux conditions of the magnetic material on both sides of the apertures $30_{10}$ tend to progress to the "down" orientation shown in FIGS. 2A and 2B. The flux switched in any ferromagnetic material is proportional to the product of the available wall area and the wall velocity. As noted hereinabove, the wall velocity is dependent upon the magnitude of the applied magnetizing force, which is the same for the material on both sides of the aperture $30_{10}$. Hence, the flux switched in the material on either side of the aperture is essentially a function of the available wall area. The relationship between wall area and the degree of saturation of a magnetic material is illustrated in FIG. 2C. Note that the available wall area is a maximum when the material is magnetically neutral and monotonically decreases to be essentially zero when the material is saturated. Hence, once again examining the flux switching around the aperture $30_{10}$ during the interrogation process, note that in the progression of the flux states of the material on both sides of the aperture $30_{10}$ towards the "down" direction, the left-hand material during the entire switching process has a greater wall area than the right-hand material. Hence, proportionally more of the one unit of interrogation flux is switched in the material to the left of the aperture $30_{10}$ than is switched in the material to the right of this aperture. In a similar manner more flux is switched to the left of aperture $32_{10}$ and to the right of the apertures $31_{10}$ and $33_{10}$ than is switched in the material on the opposite sides of these apertures.

As mentioned above, each of the output windings 73 is coupled to the material on either side of the corresponding core aperture in an opposite polarity. Hence, the signals induced by the switching of flux in the material on either side of a cross leg aperture have a cancelling effect on one another. But as a larger flux change has occurred in the material to the left of the aperture $30_{10}$ than has transpired in the material to the right, the left-hand material induces a larger signal in the output winding 73 coupled to the aperture $30_{10}$ than does the right-hand material. Hence, the two induced signals do not fully cancel and a net voltage is generated in the associated output winding 73 and thereby also in the output circuit 80 including this winding. The polarity of the output signal is shown in FIG. 1 alongside the winding 80. In a similar manner, the input information stored around each of the other digit apertures $31_{10}$ through $33_{10}$ is supplied to the output circuits 81 through 83. The polarity of these signals is also shown in FIG. 1 alongside the corresponding output circuits.

Figure 5:
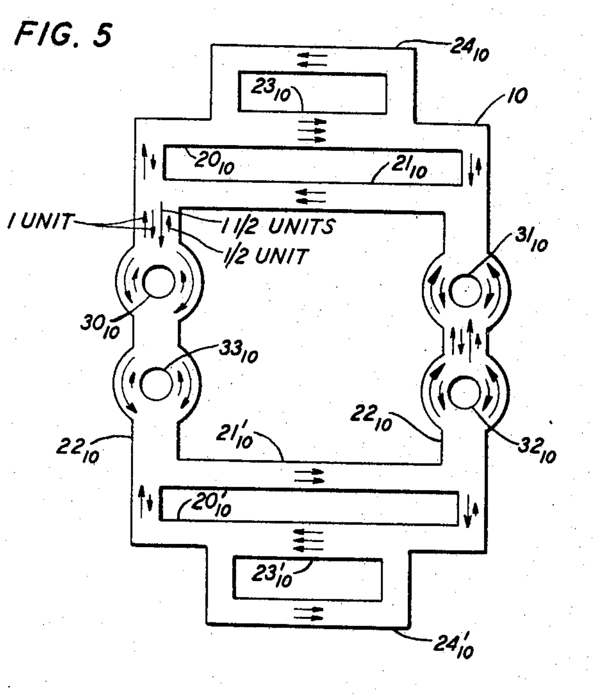
FIG. 5 is a diagram of a third magnetic condition for a particular multiapertured core illustrated in FIG. 1.

After the selected core 10 is interrogated, the flux state of the core is as illustrated in FIG. 5 and the core is reset to the condition shown in FIG. 4 by an energization signal supplied to the reset winding 46 by the reset current source 45 in the direction of the vector 115. The energized winding 46 resets the driving legs $20_{10}$ and $20'_{10}$, the interrogation legs $24_{10}$ and $24'_{10}$ and the cross legs $22_{10}$ back to the condition shown in FIG. 4 by again saturating the driving legs $20_{10}$ and $20'_{10}$, thereby switching one unit of flux through these magnetic members in a clockwise direction. As one unit of flux is switched in each of the cross legs $22_{10}$, the material surrounding each of the apertures $30_{10}$ through $33_{10}$ also returns to the magnetic state illustrated in FIG. 4. The switching process at this time is the direct converse in every respect to the switching around these apertures which occurred when the winding 42 was energized during the previous interrogation cycle. It is noted that the energized reset winding 46 has no deleterious effect on the core 11, as the reset magnetizing forces are supplied to members of this core in a direction in which they are already saturated.

The specific illustrative store depicted in FIG. 1 may advantageously be repeatedly interrogated in the above-described nondestructive manner without limitation. At such time as it is desired to erase the information stored in the cores and supply new input information thereto, the erase current source 48 is energized to supply a curt in the direction of the vector 120 to the erasing wind- 49. The energized winding 49 supplies a clockwise gnetomotive force to one of the cross legs 22 included each of the cores 10 and 11, thereby to reverse two ts of flux in a clockwise direction in the cross legs This erases all the information which had been stored ound each of the apertures 30 through 33 in each of cores 10 and 11 by saturating the cross legs 22. The cuit is then in the initial, erased state assumed herein- ove, and is ready to initiate a new write-in cycle of in- t information.

Several things should be observed at this point. First, te that each of the high speed flux sources including legs 20, 23 and 24, and 20', 23' and 24', supplies two ible magnitudes of flux to the cross legs 22 during the errogation cycle of circuit operation. When the flux urce undergoes a transition between either of the two x states, no member included therein, nor any other ember in either of the cores 10 or 11 is driven be- een saturation states. The degree of heating in any rromagnetic material is substantially reduced if the aterial included therein is not driven between remanent turation conditions and, as is well known, a decrease the heating of a magnetic core allows the core to be erated at a higher repetition rate. Hence, the informa- on storage arrangement depicted in FIG. 1 is inherent- capable of being interrogated in a nondestructive man- r at very high operational speeds, which is a desirable lvantage.

It is apparent that any flux flowing in the cross legs of the cores 10 and 11 should advantageously have a opensity for dividing equally in the ferromagnetic ma- rial on each side of each of the apertures 30 through 3. To enhance this flux division, the outer extremities f the rectangular core apertures formed by the driving gs 20 and 20' with the shunt legs 21 and 21', respec- vely, are made colinear with the centers of the aper- ires 30 through 33. This symmetry aids the balancing f flux in the cross legs 22.

Also, only one of the shunt legs 21 and 21' along with s associated flux source is, in fact, essential for circuit peration, and the redundant members may simply be eplaced by a magnetic member, having no windings nked thereto, characterized by a like flux capacity as ach of the cross legs 22. However, both of the shunt legs 1 and 21' along with the corresponding elements in- luded in the high speed interrogation flux sources are mployed in the illustrative embodiment shown in FIG. simply to make the cores symmetrical and thereby fur- her enhance the balancing of flux through the cross egs 22 associated therewith.

Summarizing, an illustrative, nondestructively inter- ogated magnetic memory, made in accordance with the principles of the present invention, includes a plurality of ferromagnetic multiapertured cores. Each core in- cludes a high speed interrogation flux source connected n parallel with a shunt, write-in leg. A cross leg is pro- vided to complete closed magnetic paths which include either the shunt leg or the flux source, and a plurality of apertures are centrally located along the long axis of the cross leg. Coupled to each aperture is an input wind- ing and an output winding which links the ferromagnetic material on either side of the aperture in an opposite polarity.

An enabling winding is provided to drive the core cross leg to a neutral magnetic condition thereby allowing information to be supplied thereto by the input windings. During the nondestructive interrogation process, the cross leg is alternately driven between a neutral state and a magnetic condition intermediate neutral and remanent saturation, thereby supplying information signals to the output windings.

It is to be understood that the above-described arrangement is only illustrative of the application of the principles of the the present invention. Numerous other arrangements may be devised by those skilled in the art without departing from the spirit and scope of this invention. For example, while four apertures were chosen for purposes of illustration, any number of apertures may be included in the cross legs 22 of each of the cores 10 and 11. In general terms, corresponding to an *n*-bit stored information word, *n* apertures would be included in each core.

What is claimed is:

1. In combination in a nondestructive memory, a square loop, ferromagnetic, multiapertured core including a cross leg having a uniform flux capacity of 2A flux units and including a plurality of apertures located on the long axis thereof, where A is any positive real number, a driving leg having a flux capacity of A flux units completing a closed magnetic path through said cross leg, a flux source connected in parallel with said driving and cross legs for supplying unidirectional flux which varies in amplitude between A and $k.A$ units, where $k$ is a positive number less than one, a plurality of input windings and a plurality of output windings each pair of said windings including one of said input and one of said output windings being respectively associated with and passing through a different one of said apertures, each of said output windings being coupled to the ferromagnetic material on each side of the associated aperture in an opposite polarity.

2. A combination as in claim 1, further including a plurality of input current sources, each connected to a different one of said input windings.

3. A combination as in claim 2, further including reset means for biasing said cross leg to a first, reset remanent hysteresis polarity, said reset means including a reset current source and a reset winding coupled to said core and connected to said reset current source.

4. In combination, a first square loop magnetic member having an aperture included therein, means connected in parallel with said first member for switching said member along its entire cross-sectional extent to a first magnetic state which comprises a fully saturated flux condition, and a flux source connected in parallel with said magnetic member for alternately switching said magnetic member along its entire cross-sectional extent to a second magnetic state which comprises a neutral flux condition, said neutral condition being characterized by a zero net resultant flux vector, and for switching said magnetic member along its entire cross-sectional extent to a third magnetic state which comprises a flux condition intermediate said neutral and remanent saturation conditions.

5. A combination as in claim 4, further including an input winding passing through said aperture and an output winding, said output winding being coupled to the ferromagnetic material on each side of the associated aperture in an opposite polarity.

6. A combination as in claim 5, further including an input current source and an output utilization means, said input current source being connected to said input winding and said output utilization means being connected to said output winding.

7. In combination in a high speed flux source, a driving leg having a flux capacity of A units, where A is any positive real number, a biasing leg connected in series with said driving leg and characterized by a flux capacity of $A+\delta$ units, wher $\delta$ is any positive number between zero and A, an interrogation leg connected in parallel with said biasing leg and characterized by a flux capacity greater than $\delta$ units and smaller than $A+\delta$ units, an interrogation winding coupled to said interrogation leg for saturating said interrogation leg, and a reset winding coupled to said driving leg for saturating said driving leg.

8. A nondestructively interrogatable magnetic memory including the combination as in claim 7 further comprising a cross leg serially connected to said driving leg and including a first aperture centrally located therein.

9. A combination as in claim 8, further including a first input winding and a first output winding passing through said aperture, said output winding being coupled to the ferromagnetic material on each side of said aperture in an opposite polarity.

10. A combination as in claim 9, further comprising a shunt leg having a flux capacity of A flux units connected in parallel with said driving leg.

11. A combination as in claim 10, wherein said reset winding is further coupled to said shunt leg and is serially connected to a reset current source.

12. A combination as in claim 8, further comprising $r$ apertures included in said cross leg and $r$ input and $r$ output windings, where $r$ is any positive integer greater than zero, each pair of said windings including one of said input and one of said output windings being respectively associated with and passing through a different one of said $r$ apertures, each of said output windings being coupled to the ferromangetic material on each side of the associated aperture in an opposite polarity.

13. In combination in a nondestructively interrogated magnetic memory, $n$ square loop, ferromagnetic, multiapertured cores, each of said cores including a cross leg characterized by a capacity of 2A flux units, where A is any real positive number and $n$ is any integer, flux supplying means serially connected to said cross legs for switching said legs along their entire cross-sectional extents to three distinct magnetic conditions characterized by respectively different flux magnitudes of 2A units, $p.A$ units and $k.A$ units, where $k$ and $p$ are independent positive numbers less than two, $r$ apertures included in each cross leg included in each of said $n$ magnetic cores, wherein $r$ is any positive integer, $r.n$ input windings each associated with and passing through a different one of said $r$ apertures in each of said $n$ cores, and $r.n$ output windings each associated with and passing through a different one of said $r.n$ core apertures, each of said output windings being coupled to the ferromagnetic material on each side of its associated aperture in an opposite polarity, each of said $n$ output windings associated with a corresponding aperture included in each of said $n$ cores being serially interconnected to form $r$ output circuits.

14. A combination as in claim 13, wherein each of said flux supplying means comprises a driving leg characterized by a capacity of A flux units, a shunt leg characterized by a capacity of A flux units connected in parallel with said driving leg, a bias leg serially included in said driving leg and characterized by a flux capacity of $A+\delta$ units, where $\delta$ is a positive real number between zero and A, an interrogation leg connected in parallel with said bias leg and characterized by a flux capacity greater than $\delta$ units and less than $A+\delta$ units, and an interrogation winding coupled to said interrogation leg.

15. A combination as in claim 14, further comprising output utilization means connected to each of said output circuits and $r.n$ input current sources each connected to a different one of said $r.n$ input windings.

16. A combination as in claim 15, further including an erasing winding coupled to said cross leg included in each of said $n$ multiapertured magnetic cores, and an erase current source serially connected to said erasing winding.

17. In combination in a magnetic memory, a first magnetic circuit comprising two parallel magnetic members each including a flux capacity of A units, where A is any positive real number, and flux supplying means coupled to said members for switching said members along their entire cross-sectional extents to a first magnetic state which comprises a fully saturated condition characterized by 2A flux units and also for alternately switching said members along their entire cross-sectional extents to two additional distinct magnetic states which comprise magnetic conditions chracterized by respectively different net flux magnitudes of zero units and a value intermediate zero and 2A units.

18. A combination as in claim 17, further comprising a first input and a first output winding coupled to said magnetic members included in said first magnetic circuit, said output winding being coupled to said first and second magnetic members in opposite polarities.

19. A combination as in claim 18, further including $r$ magnetic circuits, where $r$ is any positive integer greater than zero, each of said circuits being serially interconnected and further connected in series with said first magnetic circuit, each of said $r$ magnetic circuits comprising first and second magnetic members connected in parallel, a plurality of input and a plurality of output windings, each pair of windings including one of said input and one of said output windings being coupled to each member included in a different one of said plurality of magnetic circuits, said output windings being coupled to each magnetic member associated therewith in an opposite polarity.

References Cited

UNITED STATES PATENTS

| | | | |
|---|---|---|---|
| 2,519,425 | 8/1950 | Barlow | 340—174 |
| 2,978,176 | 4/1961 | Lockhart | 340—174 |
| 3,045,215 | 7/1962 | Gianola | 340—174 |
| 3,048,826 | 8/1962 | Averill | 340—174 |
| 3,059,224 | 10/1962 | Post | 340—174 |
| 3,229,263 | 1/1966 | Luebbe | 340—174 |

BERNARD KONICK, *Primary Examiner.*

M. S. GITTES, *Assistant Examiner.*